United States Patent
Wu et al.

(10) Patent No.: US 8,664,137 B2
(45) Date of Patent: Mar. 4, 2014

(54) REGENERATING METHOD FOR ACTIVATED ALUMINA USED IN REGENERATING WORKING FLUID OF HYDROGEN PEROXIDE

(75) Inventors: Qiufang Wu, Shanghai (CN); Guojian Chen, Shanghai (CN); Fuqing Li, Shanghai (CN); Xinsheng Ma, Shanghai (CN); Gang Chen, Shanghai (CN); Jinghui Yang, Shanghai (CN); Zhiping Zhang, Shanghai (CN)

(73) Assignee: Shanghai Huaming Hi-Tech (Group) Co., Ltd., Xu Hui District, Shanghai (CN)

( * ) Notice: Subject to any disclaimer, the term of this patent is extended or adjusted under 35 U.S.C. 154(b) by 243 days.

(21) Appl. No.: 12/675,774

(22) PCT Filed: Jan. 28, 2008

(86) PCT No.: PCT/CN2008/070197
§ 371 (c)(1),
(2), (4) Date: Feb. 27, 2010

(87) PCT Pub. No.: WO2009/026792
PCT Pub. Date: Mar. 5, 2009

(65) Prior Publication Data
US 2010/0310448 A1    Dec. 9, 2010

(30) Foreign Application Priority Data
Aug. 29, 2007 (CN) .......................... 2007 1 0094049

(51) Int. Cl.
*B01J 38/26* (2006.01)
*B01J 20/00* (2006.01)
*C01B 15/023* (2006.01)
*C01F 7/02* (2006.01)

(52) U.S. Cl.
USPC ............. 502/47; 502/414; 423/628; 423/625; 423/590

(58) Field of Classification Search
USPC ............. 423/628, 625, 590; 502/414, 415, 25, 502/55; 552/265, 208, 212, 267
See application file for complete search history.

(56) References Cited

U.S. PATENT DOCUMENTS

| | | | | |
|---|---|---|---|---|
| 2,401,739 | A * | 6/1946 | Johnson | 502/43 |
| 4,061,598 | A * | 12/1977 | Makar | 502/330 |
| 2002/0115554 | A1* | 8/2002 | Zhou | 502/28 |
| 2010/0310448 | A1* | 12/2010 | Wu et al. | 423/628 |
| 2011/0059008 | A1* | 3/2011 | Li et al. | 423/628 |

* cited by examiner

Primary Examiner — Jennifer Smith
(74) Attorney, Agent, or Firm — Global IP Services; Tianhua Gu

(57) ABSTRACT

A regenerating method for activated alumina used in regenerating working fluid of hydrogen peroxide comprises the following steps: adding deactivated alumina discharged from a regenerating bed for working fluid of hydrogen peroxide into a reactor through the top of the reactor and settling by gravity, oxidizing atmosphere entering into the reactor from the bottom of the reactor and running upwardly, then discharging exit gas and regenerated alumina through the discharge port on the top and discharging device on the bottom of the reactor respectively. The method is economic, environment-protective, safe, low-costly. The regenerated alumina will not poison palladium catalyst.

6 Claims, No Drawings

REGENERATING METHOD FOR ACTIVATED ALUMINA USED IN REGENERATING WORKING FLUID OF HYDROGEN PEROXIDE

CROSS REFERENCE TO RELATED PATENT APPLICATION

The present application is the US national stage of PCT/CN2008/070197 filed on Jan. 28, 2008, which claims the priority of the Chinese patent application No. 200710094049.8 filed on Aug. 29, 2007, which application is incorporated herein by reference.

FIELD OF THE INVENTION

The present invention relates to a regenerating method for activated alumina used in regenerating working fluid of hydrogen peroxide.

BACKGROUND OF THE INVENTION

As known to all, the industrial production of hydrogen peroxide by anthraquinone route is a cycle process, anthraquinones dissolved in organic solvent is hydrogenated into anthrahydroquinones in the presence of palladium catalyst, and then anthrahydroquinones are oxidized into anthraquinone peroxides using air or oxidizing atmosphere. The hydrogen peroxide solution and anthraquinone organic phase will be generated by extraction of anthraquinone peroxide by water. The anthraquinone solution related in the cycle of hydrogenation-oxidation-extraction is called working fluid in industry. Anthraquinones used are usually alkyl anthraquiliones, more frequently-used are 2-alkylanthraquinones, for example, 2-ethylanthraquinone, 2-amylanthraquinone, 2-butylanthraquinone and their 5,6,7,8-tetrahydro alkyl anthraquinone derivatives. The solution is usually binary solvent made of hydrocarbon solvent such as arene, alkane or cycloalkanes, and trioctyl phosphate, triethyl phosphate or methyl cyclohexanol acetate, for example, the binary solvent made of arene and trioctyl phosphate is more frequently-used.

During the process of hydrogenation reduction, the main reactions are the synthesis of anthrahydroquinone (AHQ) by reduction reaction of anthraquinone (AQ) (reaction 1) and the synthesis of tetrahydro anthrahydroquinones (THAHQ) by hydrogenation of anthraquinones (reaction 2), and the rate of the oxidation reaction of tetrahydro anthrahydroquinone to synthesize tetrahydroanthraquinone (THAQ) (reaction 7) is lower than the rate of the oxidation reaction of anthrahydroquinone (reaction 8). The higher the content of tetrahydro anthrahydroquinone is, the more the energy consumption of oxidation reaction process is, and the energy consumption content of the oxidation reaction process is higher than half of energy consumption of the whole cycle process. In industry, anthraquinone, anthrahydroquinone, tetrahydroanthraquinone and tetrahydroanthraquinone are effective anthraquinones in working fluid. In addition, the side reaction of hydrogenation of tetrahydro anthrahydroquinone might be proceeded to generate octahydroanthrahydroquinone (OHAHQ) (reaction 3), theoretically, octahydroanthrahydroquinone can be oxidized to generate peroxide, however, the oxidation rate is very slow and it doesn't have any industrial value at all. Therefore, octahydroanthrahydroquinone is viewed as degradation product.

The cycle of reduction and oxidation repeated and the degradation products including hydroxyl anthrone (e.g. oxanthrone (OAT) in reaction 4), anthrone (e.g. anthranone (AT) and bianthrone (DAT) in reaction 5), and anthrahydroquinone epoxides (THAQE) (reaction 6) are generated during side reaction.

The reactions and side reactions in the reductive reaction process are as follows:

Reaction 1:

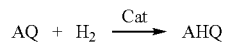

Reaction 2:

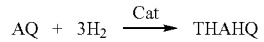

Reaction 3:

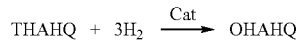

Reaction 4:

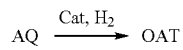

Reaction 5:

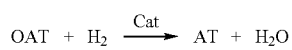

The reactions and side reactions in the oxidation process are as follows:

$$THAHQ + O_2 \rightarrow THAQE + H_2O \quad \text{Reaction 6}$$

$$THAHQ + O_2 \rightarrow THAQ + H_2O_2 \quad \text{Reaction 7}$$

$$AHQ + O_2 \rightarrow AQ + H_2O_2 \quad \text{Reaction 8}$$

During the productive cycle of hydrogen peroxide, useless degradation products generated in every cycle are limited in quantity. However, the accumulation of degradation products from many repeated cycles in the working fluid will reduce the concentration of the effective anthraquinones including anthraquinone and anthrahydroquinone in the working fluid which will cause many problems such as production efficiency. The working fluid should be regenerated to avoid the accumulation of such degradation products in it. The industrialized regenerating method in this field is contacting the working fluid with $\alpha$-$Al_2O_3$ or $\gamma$-$Al_2O_3$ to transform the degradation products into effective anthraquinones. The alumina used as catalytic agent here is called activated alumina. For example, German Patent DE 1,273,499 described the process of transforming tetrahydroanthraquinone epoxides into tetrahydroanthraquinone by reducing action of tetrahydroanthrahydroquinone in the presence of basic alumina (reaction 9):

Reaction 9:

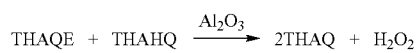

The regenerating process of working fluid mentioned in US statutory invention registration H1787 is contacting working fluid with $\gamma$-$Al_2O_3$ at the temperature of 50-100° C. before regenerated, 3 mol of tetrahydroanthraquinone are transformed into 1 mol of anthraquinone and 2 mol of anthrahydroquinone (reaction 10). In addition, it is also indicated that the transformation efficiency is low and there will be large amount of by-products generated because of immediate regeneration after reduction.

Reaction 10:

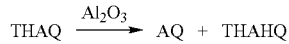

$$\text{THAQ} \xrightarrow{\text{Al}_2\text{O}_3} \text{AQ} + \text{THAHQ}$$

A regenerating method for working fluid used for the production of hydrogen peroxide was reported in Chinese patent CN1168654C. Alumina granular made by extrusion were used in this patent and alkali metals, alkaline-earth metals or rare earth elements were added into alumina. Preferably, the alumina had a granularity of no more than 3.5 mm and a specific surface area of no less than 50 m²/g.

Such measures above are conducted to raise the transformation efficiency of the degradation products in working fluid or to extend the life time of alumina to reduce the cost of alumina replacement. The deactivation reason of alumina used in the production process of hydrogen peroxide is the crystallization and precipitation of degradation products and polymers of the solvent ingredients which caused the decline of active surface area and the lost of alkaline composition in some techniques. In fact, the renewal period of activated alumina varies from several days to dozens of days according to different processes. The renewal of activated alumina is the focus of attention for the manufacturer of hydrogen peroxide. Firstly, the frequent renewal of activated alumina will raise the cost, and secondly, the deactivated alumina can't be disposed freely because it contains organics such as oxanthrone and so on which might cause the spread of pollution. However, there are few methods to deal with these problems and few patents that present the regenerating methods of deactivated alumina used in the production of hydrogen peroxide. French Patent Fr 1,304,901 presents the regenerating method of activated sodium silicoaluminate alumina firstly. In the first place, the activated alumina should be washed using suitable solvent at the temperature of 80° C. and then treated by the steam of 130° C. to remove the residual solvent, and at last, the catalytic agent will be heat-treated for more than 1 hour, more preferred 8-12 hours at 400-450° C. This processing method also has disadvantages: high contents of residual carbon and sulfur in the regenerated alumina. The content of sulfur which might poison palladium catalyst will be transferred from the regenerated alumina to the working fluid.

U.S. Pat. No. 4,351,820 presents the high-temperature regenerating method of is sodium silicoaluminate used for the production of hydrogen peroxide which has 55-63% of alumina, the method contains the steps comprising: adding the deactivated sodium silicoaluminate into the oven filled with oxidizing atmospheres at 650-700° C. and then the oven is heated to 700-850° C. The air and the deactivated sodium silicoaluminate are added continuously in the same direction by using gas external heating rotary kilns. This method needs additional heating energy to preheat gas and solid materials added into the oven and evaporation of a large number of water, and at last the combustion temperature of organics will be achieved therein. Although it will satisfy the requirements of repeated regeneration, the technical disadvantage of this method is the high cost.

SUMMARY OF THE INVENTION

The present invention provides a regenerating method for activated alumina used in regenerating working fluid of hydrogen peroxide to overcome the defects of the existing technology.

The inventive concepts of the present invention are as follows:
because the deactivated alumina taken out from the facilities usually comprises 8-25% (by weight percent, the same below) of water and 8-22% of organics, the present invention assumed that the carbureted hydrogen organics are burned into carbon dioxide and water by sufficient burning in the presence of oxygen to make full use of the combustion heat of organics, and the heat of combustion is used to heat the solid materials and oxidizing atmosphere without additional heat. The regenerated alumina processed by this method has low residual carbon and sulfur content and stable specific surface area and can be used in the reverse conversion of degradation products in working fluid during the production process of hydrogen peroxide and the alumina can be regenerated and applied repeatedly.

The method of the present invention comprises the following steps:
adding deactivated alumina discharged from a regenerating bed for working fluid of hydrogen peroxide into a reactor through the top of the reactor and settling by gravity, oxidizing atmosphere entering into the reactor from the bottom of the reactor and running upwardly, then discharging exit gas and regenerated alumina through the discharge port on the top and discharging device on the bottom of the reactor respectively after several chemical and physical processes including reheating, evaporation of water, heating, burning and temperature reduction which are proceeded in turn.

The non-limiting reactor employed in the present invention has the main characteristics of solid feeding device and gas discharge side in the upper part, discharge device and compressed gas inlet in the under part. In addition, the section shape of said reactor is selected from square, rectangular and round. The height-diameter ratio of the reactor is bigger than or equal to 3, preferably bigger than or equal to 10. The ektexine of the reactor is made of thermal insulation material.

Said oxidizing atmosphere is selected from the group comprising the mixture of air and combustion gas, the mixture of air and nitrogen and/or carbon dioxide and air, wherein the volume fraction of oxygen ranging from 2% to 21%, preferably ranging from 4% to 15%.

Ordinarily, the deactivated alumina unloaded from the regenerating device of hydrogen peroxide working fluid comprises 8-25% (by weight percent, the same below) of water, total content of organics is ranging from 8% to 22% and the rest is inorganic framework materials such as alumina. For this kind of solid materials, it needs additional energy consumption because of the heat that needed for the preheating of large number of gas and the sensible heat taken off in the situation of excessively low concentration of oxygen in the oxidizing atmosphere. In the situation of excessively high concentration of oxygen in the oxidizing atmosphere, the combustion velocity of the high-temperature combustion section is too fast and the temperature of solid particle raises rapidly, and phase change from $\gamma$-$Al_2O_3$ to $\alpha$-$Al_2O_3$ will happen in case the temperature of solid particle raise to above 1100° C. Additionally, the consequences of the phase change is the fusion of particles and micron grains in the particles which causes the decrease of micro pores inside the particles and specific surface area. In extreme cases, it might cause block of the moving bed reactor in unusual service conditions.

The reaction temperature is ranging from 380° C. to 800° C., and the stay time of solid materials in the reactor is ranging from 3 h to 15 h, preferably ranging from 5 h to 12 h.

The shorter the stay time is, the higher residual carbon in regenerated alumina is. Additionally, it might effect the life time of regenerated alumina. The investment and operating cost of the facilities will be increased and it is uneconomical if the stay time is too long.

The temperature of said oxidizing atmosphere before entering into reactor could be ranging from −10° C. to 450° C. and its pressure is ranging from 0.20 MPa to 0.60 MPa. Under normal operating conditions, the temperature of oxidizing atmosphere while entering into reactor is ranging from the dew point temperature of vapor at operating pressure to 60° C.

The volume-weight ratio of oxidizing atmosphere to solid materials based on the oxygen content of oxidizing atmosphere is as follows;

oxygen:solid materials=0.08~0.60NM$^3$/kg; NM$^3$ refers to normal cubic meters.

The specific surface area of the regenerated alumina sphere obtained by the method of present invention is 80 m$^2$/g at least, and the residual carbon content is less than 0.5% (by weight percent), particle's compressive strength is 70N at least.

The method is economic, environment-protective, safe, low-costly. The regenerated alumina will not poison palladium catalyst. Therefore, the method in the present invention is simple and feasible for the industrialized production. The regenerating method of deactivated alumina in the present invention doesn't need supererogatory energy added under normal continuous operating conditions and therefore has prominent energy conservation characteristic's, the organics are sufficiently burned into carbon dioxide and water that are released from the outlet of reactor at last, and the regenerated alumina can be used in regenerating working fluid during the production process of hydrogen peroxide without influence on the acid-base properties of working fluid or normal productivity of hydrogen peroxide and the energy consumption.

DETAIL DESCRIPTION OF THE INVENTION

The examples are used for understanding the method and effect of the present invention, but the present invention is not limited to the examples above.

Example 1~4

The raw materials used are from Factory A and the deactivated alumina spherical particles unloaded from the regenerating device of hydrogen peroxide working fluid had an average grain diameter of 2 mm. The contents of water and organics of deactivated alumina form different cycle period were shown in Table 1.

The deactivated alumina discharged from a regenerating bed for working fluid of hydrogen peroxide were added into a reactor through the top of the reactor and settled by gravity. Oxidizing atmosphere entered into the reactor from the bottom of the reactor and ran upwardly followed by several chemical and physical processes including reheating, evaporation of water, heating, burning and temperature reduction which were proceeded in turn. After the reaction, regenerated alumina and the exit gas were discharged through the discharge port on the bottom and discharging device on the top of the reactor respectively.

The actor was the cylinder having an inside diameter of 288 mm and a height-diameter ratio of 22 with external thermal insulation.

The reaction parameters were as follows:

Example 1

The gas pressure of reactor inlet was 0.25 MPa, the temperature was 38° C., the oxidizing atmosphere was made of air which had a volume content of 6.8% and combustion gas, the reaction temperature was 405° C., the stay time of solid materials in the reactor was 9.9 h, the volume-weight ratio of oxygen-containing to solid materials based on the oxygen content of oxidizing atmosphere was as follows: oxygen: solid materials=0.20NM$^3$/kg;

Example 2

The gas pressure of reactor inlet was 0.23 MPa, the temperature was 40° C., the oxidizing atmosphere was made of air which had a volume content of 13.6% and combustion gas, the reaction temperature was 550° C., the stay time of solid materials in the reactor was 9.8 h, the volume-weight ratio of oxygen-containing to solid materials based on the oxygen content of oxidizing atmosphere was as follows: oxygen: solid materials=0.49NM$^3$/kg;

Example 3

The gas pressure of reactor inlet was 0.20 MPa, the temperature was 45° C., the oxidizing atmosphere was made of air which has a volume content of 6.3% and combustion gas, the reaction temperature was 508° C., the stay time of solid materials in the reactor was 8.5 h, the volume-weight ratio of oxygen-containing to solid materials based on the oxygen content of oxidizing atmosphere was as follows: oxygen: solid materials=0.0.29NM$^3$/kg;

Example 4

The gas pressure of reactor inlet was 0.22 MPa, the temperature was 39° C., the oxidizing atmosphere was made of air which had a volume content of 12.5% and combustion gas, the reaction temperature was 425° C., the stay time of solid materials in the reactor was 10.9 h, the volume-weight ratio of oxygen-containing to solid materials based on the oxygen content of oxidizing atmosphere was as follows: oxygen: solid materials=0.46NM$^3$/kg.

TABLE 1

|  |  | Example 1 | Example 2 | Example 3 | Example 4 |
|---|---|---|---|---|---|
| Materials | Content of water, % wt | 11.2 | 9.0 | 12.5 | 10.8 |
|  | Content of organics, % wt | 16.6 | 19.6 | 14.0 | 17.8 |
| Operating conditions | Oxygen concentration, % (volume) | 6.8 | 13.6 | 6.3 | 12.5 |
|  | Gas flow, m$^3$/h | 80 | 100 | 150 | 90 |
| products | Output, kg/h | 41.5 | 41.2 | 48.8 | 37.1 |
|  | BET, m2/g | 151.8 | 146.5 | 184.6 | 149.1 |
|  | Residual carbon, % | 0.3 | 0.4 | 0.3 | 0.4 |
|  | compressive strength, N | 76 | 88 | 74 | 86 |

Example 5

The product regenerated by the materials in example 1 and new activated alumina were used in regenerating working fluid of hydrogen peroxide and the mass ratio of the product regenerated by the materials in example 1 and new activated alumina was 1:1. The materials of example 2 were obtained after 7 days, and then the product obtained in example 2 and new activated alumina were used in regenerating working fluid of hydrogen peroxide and the mass ratio of the product obtained in example 2 and new activated alumina was 1:1. The materials of example 3 were obtained after 7 days, and then the product obtained in example 3 and new activated alumina were used in regenerating working fluid of hydrogen peroxide and the mass ratio of the product obtained in example 3 and new activated alumina was 1:1. The materials of example 4 were obtained after 7 days, and the products in example 4 still had great operating characteristics in specific surface area, residual carbon content and compressive strength.

Example 6

The materials S1 from the manufacturer S which produced hydrogen peroxide were used in example 6, and the deactivated alumina spherical particles unloaded from the regenerating device of hydrogen peroxide working fluid had an average grain diameter of 5 mm and comprising 22.4% of water, 10.3% of total organics and particle's compressive strength was 32N.

The diameter of the actor was changed into 488 mm and its height-diameter ratio was 13. The process flow applied was the same as example 1. The gas pressure of reactor inlet was 0.35 MPa, the temperature was 38° C., the oxygen content was 7.2% (by volume), the flow rate of oxidizing atmosphere was 350 m³/h, the stay time of solid materials in the reactor was 8.8 h, and the volume-weight ratio of oxygen-containing to solid materials based on the oxygen content of oxidizing atmosphere was as follows: oxygen:solid materials=0.40NM³/kg, the productivity was 102 kg/h. The evaluation results of S1 products were shown in Table 2.

In Table 2, the regeneration capability of alumina for regenerating working fluid was estimated by the method comprising following steps: adding 100 g of sample alumina into 500 ml of stock working fluid (wherein the total content of 2-ethylanthraquinone and 2-ethyl-5,6,7,8-tetrahydro anthraquinone was 183.11 g/L and the degradation products content was 8.65 g/L) that had been extracted served by S factory and then soaked at 45° C. for 6 h, then after filtering separation, measuring the concentration of 2-ethylanthraquinone and tetrahydroanthraquinone in the regenerating working fluid by polarography determination, and then calculating the regeneration capability of alumina for regenerating working fluid according to the following formula wherein total content of effective anthraquinones C (g/L) referring to the sum of the concentration of anthraquinone and tetrahydroanthraquinone:

$$\text{Regeneration capability} = \frac{C - C_0}{C_d} \times 100$$

In the formula above, $C_o$ and $C_d$ referred to the total content of effective anthraquinones (g/L) in the stock working fluid and total degradation products content in the stock working fluid (g/L) respectively.

Simulated working fluid was prepared by the method comprising following steps: dissolving 2-ethylanthraquinone in the mixture of arene (75 v %) and triethyl phosphate (25 v %) to obtain a solution in which the content of 2-ethylanthraquinone was 13.5% (wt %) and adding 0.1% (wt %) of water into the solution. The arene used here was C9 arene which had a boiling range from 150° C. to 180° C.

1000 kg of Product S1 was added into the fixed bed container and then soaked into the simulated working fluid at 45° C. for 96 h, the simulated working fluid was discharged from the fixed bed container and then solid particles were removed form the fixed bed container after steaming out with the pressure of 0.4 MPa and following temperature reduction to obtain Material S2. The contents of water and organics of Material S2 were shown in Table 2. In addition, the evaluation results of alumina after 5 rounds of simulated working fluid soaking-regenerating process were shown in Table 2.

TABLE 2

| | Materials | | Properties of the regenerated alumina products | | | |
|---|---|---|---|---|---|---|
| Cycle | Water, % | Organics, % | BET, m²/g | Residual carbon, % | Compressive strength, N | Regeneration capability, % |
| S1 | 22.4 | 10.3 | 154 | 0.3 | 68 | 88 |
| S2 | 24.3 | 8.8 | 152 | 0.4 | 69 | 86 |
| S3 | 23.8 | 9.1 | 151 | 0.2 | 70 | 87 |
| S4 | 23.1 | 9.2 | 149 | 0.2 | 72 | 85 |
| S5 | 22.7 | 8.9 | 149 | 0.3 | 70 | 86 |

What is claimed is:

1. A method for regenerating deactivated alumina from regenerating working fluid in making hydrogen peroxide to become activated alumina consisting of following steps:
   adding the deactivated alumina containing organic materials into a reactor through a top of the reactor and settling by gravity;
   adding oxidizing atmosphere entering into the reactor from a bottom of the reactor and the oxidizing atmosphere runs upwardly; then
   discharging exit gas through a discharge port on a top of the reactor and discharging regenerated alumina through a discharging device on a bottom of the reactor respectively;
   wherein, a reaction temperature is in a range from 380 C.° to 800 C.°, a stay time of solid materials in the reactor is in a range from 3 h to 15 h, and a volume-weight ratio of oxygen contained in the oxidizing atmosphere to the deactivated alumina is as follows:

Oxygen:deactivated alumina=0.08~0.60NM³/kg;

carbureted hydrogen organic materials in the deactivated alumina are exhausted by self-burning in the oxidizing atmosphere.

2. The method according to claim 1, wherein said oxidizing atmosphere is selected from a group consisting of a mixture of air and combustion gas, a mixture of air and nitrogen, a mixture of carbon dioxide and air, and a mixture of carbon dioxide, nitrogen and air.

3. The method according to claim 1, wherein a volume fraction of the oxygen in the oxidizing atmosphere is ranging from 2% to 21%.

4. The method according to claim 1, wherein a cross-section of said reactor is square or rectangular or round.

5. The method according to claim 4, wherein a height-diameter ratio of the reactor is in a range from 3 to 30.

6. The method according to claim 4, wherein a temperature of said oxidizing atmosphere before entering into reactor is in a range from −10 C.° to 450 C.° and its pressure is in a range from 0.20 MPa to 0.60 MPa.

* * * * *